(12) United States Patent
Chapman et al.

(10) Patent No.: US 7,423,087 B2
(45) Date of Patent: Sep. 9, 2008

(54) REDUCED FUMING FLUOROPOLYMER

(75) Inventors: Gregory Allen Chapman, Washington, WV (US); David E. Bidstrup, Parkersburg, WV (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 207 days.

(21) Appl. No.: 10/836,657

(22) Filed: Apr. 30, 2004

(65) Prior Publication Data

US 2005/0245709 A1    Nov. 3, 2005

(51) Int. Cl.
*C08L 27/12* (2006.01)

(52) U.S. Cl. .................. 525/192; 525/11; 525/200; 526/242; 526/254

(58) Field of Classification Search ............ 526/242, 526/254; 525/192, 11, 200
See application file for complete search history.

(56) References Cited

U.S. PATENT DOCUMENTS

| | | | | |
|---|---|---|---|---|
| 4,626,587 A | * | 12/1986 | Morgan et al. | 528/481 |
| 4,743,658 A | * | 5/1988 | Imbalzano et al. | 525/326.4 |
| 5,309,148 A | * | 5/1994 | Birk | 340/628 |
| 5,356,986 A | * | 10/1994 | Stewart et al. | 524/462 |
| 6,395,848 B1 | * | 5/2002 | Morgan et al. | 526/214 |
| 6,720,360 B1 | * | 4/2004 | Grootaert et al. | 521/28 |
| 7,211,629 B2 | * | 5/2007 | Chapman et al. | 525/192 |

FOREIGN PATENT DOCUMENTS

| | | |
|---|---|---|
| EP | 0 928 673 A1 | 7/1999 |
| EP | 1 170 303 A1 | 1/2002 |
| EP | 1170303 A1 * | 1/2002 |
| WO | WO 02/50135 A1 | 6/2002 |
| WO | WO 2004/044014 A2 | 5/2005 |

OTHER PUBLICATIONS

William C. Seidel et al., Chemical, Physical, and Toxicological Characterization of Fumes Produced by Heating Tetrafluoroethene Homopolymer and Its Copolymers With Hexafluoropropene and Perfluoro(Propyl Vinyl Ether), Chem. Res. Toxicol. 1991, 4, pp. 229-236.

* cited by examiner

*Primary Examiner*—Peter D. Mulcahy
*Assistant Examiner*—Henry Hu

(57) ABSTRACT

The present invention relates to the reduction of oligomer content of melt-processible fluoropolymer so that the fluoropolymer has at least 25 ppm less oligomer than the as-polymerized fluoropolymer.

5 Claims, No Drawings

REDUCED FUMING FLUOROPOLYMER

BACKGROUND OF THE INVENTION

1. Field of the Invention

This invention relates to melt-processible fluoropolymer that is characterized by reduced particulate emissions at elevated temperatures.

2. Description of Related Art

Fluoropolymer can be described as having certain number average or weight average molecular weight, but it is well-known that it is made up of polymer chains of various molecular weights. The smaller polymer chains comprise the lower molecular weight fractions of the polymer and can be described as oligomers. In melt processing these oligomers have some volatility and can separate from the mass of molten polymer, forming particulate that can cause polymer fume fever as disclosed in Seidel et al., "Chemical, Physical, and Toxicological Characterization of Fumes Produced by heating Tetrafluoroethylene Homopolymer and its Copolymer with Hexafluoropropylene and Perfluoro(propyl vinyl ether)", *Chem. Res. Toxicol.* 1991, 4, 229-236.

It is desirable to have fluoropolymer that has reduced particulate emissions at elevated temperatures.

BRIEF SUMMARY OF THE INVENTION

The present invention satisfies this desire by providing melt-processible fluoropolymer of substantially reduced emission of particulates. As determined by the amount of oligomer that can be removed from fluoropolymer, the trace amounts of oligomer present in fluoropolymers as reported in Seidel et al. is measurable in parts (weight) per million (ppm). The fluoropolymer of the present invention can be characterized by the fluoropolymer having at least about 25 ppm oligomer less than as-polymerized. The amount of oligomer in the fluoropolymer is the result of premature termination of the polymer chain during the polymerization process; this is the as-polymerized oligomer content of the fluoropolymer.

The fluoropolymer of the present invention can also be characterized by the process by which it is made, i.e. to reduce the as-polymerized oligomer content. Thus, the fluoropolymer having a lowered oligomer content is made by melting the fluoropolymer, creating an infinite surface of the molten fluoropolymer, contacting this infinite surface with gas, and devolatilizing the resultant molten fluoropolymer. This embodiment too is preferably carried out to reduce the oligomer content of the as-polymerized fluoropolymer by at least 25 ppm oligomer.

Since the volatile material that is emitted from the fluoropolymer is particulate material, which is referred to herein as oligomer, the reduction in oligomer content to obtain the fluoropolymer of the present invention can be characterized by reduced emission of particulates, which can be detected by voltage change from an ionizing smoke detector. The fluoropolymer according to this embodiment of the present invention, upon being subjected to the Smoke Detector Test is characterized by exhibiting a voltage change of no more than about 25% of the voltage change exhibited by the as-polymerized fluoropolymer at the upper continuous use temperature of the fluoropolymer. The upper continuous use temperature for fluoropolymers is established and published by the fluoropolymer manufacturer. The Smoke Detector Test is essentially the measurement equipment and procedure referred to in Seidel et al. and will be described in greater detail later herein.

In all of the foregoing embodiments of the present invention, the fluoropolymer is melt processible, since the method of reducing oligomer content from the as-polymerized amount involves melt processing. The fluoropolymer is also free of alkali and alkaline earth metal so as to avoid any deleterious effect of such metal on the melt processing of the fluoropolymer.

For melt-processible tetrafluoroethylene/hexafluoropropylene (TFE/HFP) copolymer commonly known as FEP, the reduced emission of particulates of the FEP of the present invention is characterized by said FEP exhibiting a voltage change of either no greater than about 0.025 volts at 200° C. or no greater than about 2 volts at 350° C. when subjected to the Smoke Detector Test, said fluoropolymer being free of alkali and alkaline earth metal.

DETAILED DESCRIPTION OF THE INVENTION

The oligomer content of melt-processible fluoropolymers can be characterized by the reduction of oligomer content under a condition used in industry most likely to reduce oligomer content. In particular, the melt extrusion of fluoropolymers sometimes includes a devolatilization zone in the extruder just prior to the extrudate existing the extruder. The high temperature of the fluoropolymer melt within the extruder provides the best opportunity for the oligomer to volatilize and the subsequent devolatilization zone provides the best opportunity for removal of the oligomer from the molten polymer. It is known to sparge a bed of fluoropolymer solids after extrusion and at elevated temperatures well below the melting temperature of the fluoropolymer to remove residual gases trapped in the solids, but sparging cannot remove the higher boiling oligomers and the temperature of sparging must be kept low enough to avoid having the fluoropolymer pellets being sparged stick together, i.e. "block".

According to the present invention, fluoropolymer is subjected to melt extrusion and devolatization in a special process that increases the opportunity for oligomer removal, and this process is operated in way to distinguish the new, low oligomer content fluoropolymer, from the oligomer content of the same fluoropolymer as-polymerized. The special process involves the melting of the fluoropolymer and creating an infinite surface for the molten fluoropolymer, similar to the boiling of a liquid, wherein molecules can depart from the liquid from any and all portions thereof. A critical aspect of this process is that the infinite surface of molten polymer is contacted with a gas stream. The gas sweeps the volatile oligomer from the polymer melt. This is apparent from the next step of subjecting the molten polymer to devolatization, collecting the oligomer within the vacuum system, and comparing its weight with the weight of fluoropolymer being melt processed. When the gas is omitted, the oligomer removal, as described above, falls to less than 1/10 of the amount removed when the gas is used. The greater amount of oligomer that is removed when gas is used remains in the fluoropolymer when gas is not used. This amount can be considered to be included in the as-polymerized amount of oligomer present in the fluoropolymer.

The process just described is not conventional in fluoropolymer melt processing, which is generally carried out to minimize the exposure of the fluoropolymer to high melt temperature for a period of time that would cause the fluoropolymer to degrade and to avoid exposing the fluoropolymer to such high shear that it causes the fluoropolymer to degrade. The exception to this precaution is the intensive extruder shearing of FEP disclosed in U.S. Pat. No. 4,626,587 to eliminate polymer chain HFP diads and triads, and wherein the degraded polymer is subjected to fluorine treatment after extrusion to eliminate the visual effects of the degradation. Degradation may be visible by discoloration of the extruded fluoropolymer. Otherwise the degradation becomes apparent from the deterioration of one or more physical properties, such as flex life, tensile strength, or elongation to break. The special process for making the fluoropolymer of the present invention, however, can be carried out in an extruder that contains a zone in which the molten fluoropolymer is subjected to surface renewal without excessive shear and within time/temperature condition to avoid degradation, and gas is injected into this zone to contact the constantly regenerating surface of molten fluoropolymer to sweep out the volatilizing oligomer. The surface renewal creates the infinite surface, simulating the boiling of a liquid, wherein the amount of surface is not measurable, but its infinite nature is indicated by the ability of the gas to sweep oligomer from the melt, revealing the extent to which interior portions of the molten resin are brought to the gas/molten polymer interface. The extent of surface renewal is not measured, but its existence is revealed by the removal of oligomer from the fluoropolymer. The molten fluoropolymer is then advanced to a devolatilizing zone, where the oligomer is removed from the molten polymer. The surface renewal zone and the devolatilization zone are separated by a plug of molten fluoropolymer created by the lesser or reverse pitch of the extrusion screw as compared to the pitch of the screw elements causing the molten fluoropolymer to advance up to the devolatilization zone. This enables the gas to intimately contact the molten fluoropolymer in the surface renewal zone without being prematurely removed in the devolatilization zone. The vacuum applied in the devolatilization zone is small so as to avoid the premature removal of the gas from the surface renewal zone. Notwithstanding the presence of the plug of molten fluoropolymer separating the surface regeneration zone from the devolatilization zone, the oligomer volatilizing and being swept out of the fluoropolymer in the surface renewal zone is removed in the devolatilization zone. After devolatilization, the fluoropolymer is cooled.

The surface renewal of the molten polymer occurring in the presence of gas contact creates the infinite surface of the molten fluoropolymer, enabling the oligomer to be removed from the fluoropolymer. This removal occurs in a short residence time in the surface renewal zone, usually less than about 60 sec.

When this process is practiced on fluoropolymer, the fluoropolymer is being subjected to extruder conditions most favorable to removing oligomer from the fluoropolymer, provided that devolatization is also practiced in the extruder. When no gas is introduced into the surface renewal zone and the molten fluoropolymer is subjected to devolatilization, the amount of oligomer collected from devolatilization corresponds to 2 ppm. When the same fluoropolymer is treated in the same way, except that an inert gas such as $N_2$ is introduced into the surface renewal zone, the amount of oligomer collected is more than 10× the amount collected when no gas is used. At least 25 ppm of oligomer is removed. When a reactive gas, such as fluorine, is introduced into the surface renewal zone, the amount of oligomer collected is more than 100× the amount collected when no gas is used. At least 200 ppm of oligomer is removed from the fluoropolymer. Examples with this information and details about the extrusion equipment used to obtain this improvement are presented later herein.

While the best result is obtained when a reactive gas such as fluorine is used, the improvement by more than a factor of 10 obtained when a non-reactive gas is used is a valuable contribution. Moreover, when the fluoropolymer contains fluorine-reactive units in the polymer chain such as ethylene units in tetrafluoroethylene/ethylene copolymer, then only a non-reactive gas should be used.

The fluoropolymer can also be subjected to the Smoke Detector Test, which is essentially the measurement equipment and procedure referred to in Seidel et al. and will be described in greater detail later herein, to measure the reduced particulates of the fluoropolymer of the present invention, as the indicator of its reduced oligomer content as compared to the as-polymerized fluoropolymer.

The special process described above is applicable to fluoropolymers in general, with temperature, tolerable shear, and residence time conditions dependent on the particular fluoropolymer. This together with the extruder components (elements) to obtain the condition of infinite surface in the zone of injected gas are selected to achieve the removal of oligomer without degrading the fluoropolymer. The extruder elements are described in the Examples. They are selected in accordance with the requirements of the fluoropolymer to obtain the infinite surface required without adversely affecting the fluoropolymer. The Examples provide a selection and arrangement of elements, in accordance with the knowledge of the melt processing characteristics of the fluoropolymer being melt processed and the need for obtaining the infinite surface to provide for optimum oligomer removal.

Examples of melt processible fluoropolymers having reduced oligomer content are copolymers of tetrafluoroethylene (TFE), with one or more of comonomers in sufficient amount to render the copolymer melt processible. The comonomers can be perfluorinated or other monovalent atoms, such as hydrogen and chlorine, in addition to fluorine can be substituted on the carbon atom chain as can pendant groups on ether linkages attached to the carbon atom chain, the fluoropolymer nevertheless containing at least about 35 wt % fluorine. By "melt-processible" it is meant that the fluoropolymer flows when heated, as distinguished from polytetrafluoroethylene, which has such a high melt viscosity that it does not flow when heated. The melt-processibility of the fluoropolymer also means that it can be melt-fabricated by such processes as extrusion and injection molding into such final articles as films, fibers, tubes, wire coatings and the like. The removal of oligomer can be part of the melt fabrication process to obtain the desired final article or can be separate from melt-fabrication, to first form pellets that are subsequently used in melt-fabrication of the desired final article.

Melt processibility generally requires that the melt viscosity be no more than about $10^6$ Pa·s. Preferably it is in the range of about $10^2$ to $10^6$ Pa·s, and most preferably about $10^4$ to $10^6$ Pa·s. Melt viscosities of the melt-processible perfluoropolymers are measured according to ASTM D 1238-52T, modified as follows: The cylinder, orifice and piston tip are made of a corrosion-resistant alloy, Haynes Stellite 19, made by Haynes Stellite Co. The 5.0 g sample is charged to the 9.53 mm (0.375 inch) inside diameter cylinder, which is maintained at 372° C.±1° C., such as disclosed in ASTM D 2116 and ASTM D 3307 for perfluorinated polymers. Five minutes after the sample is charged to the cylinder, it is extruded through a 2.10 mm (0.0825 inch) diameter, 8.00 mm (0.315 inch) long square-edge orifice under a load (piston plus weight) of 5000 grams. This corresponds to a shear stress of 44.8 kPa (6.5 pounds per square inch). The melt viscosity in Pa·s is calculated as 53170 divided by the observed extrusion rate in grams per 10 minutes. The melt viscosity of fluoropolymers containing hydrocarbon groups in the polymer chain can be determined in accordance with ASTM procedures for these particular polymers, such as ASTM D 3159 and ASTM D 5575.

One example of fluoropolymer is the copolymer of TFE with hexafluoropropylene (HFP), commonly known as FEP. Additional copolymerized monomer may be present in the FEP such as perfluoro(ethyl or propyl vinyl ether). Ethylene may also be copolymerized with the TFE and HFP to form EFEP. Another example of fluoropolymer is the copolymer of TFE with perfluoro(alkyl vinyl ether) (PAVE), and perfluorodimethyl dioxole (PDD). TFE/PAVE copolymers are commonly known as PFA, which can include MFA. PAVE include perfluoro(alkyl vinyl ether), wherein the alkyl group contains from 1-8 carbon atoms, preferably 1 to 3 carbon atoms, such as perfluoro(propyl vinyl ether) (PPVE), perfluoro(ethyl vinyl ether) (PEVE), and perfluoro(methyl vinyl ether) (PMVE) or mixtures thereof. The copolymer of TFE/PMVE and PPVE is commonly known as MFA. PFA is commonly used in extrusion and injection molding to make processing equipment for use in semiconductor manufacture, wherein extreme purity and chemical inertness of the processing equipment is essential. Much technology has been developed to enhance the chemical inertness of the PFA and to provide smooth surfaces of the PFA-fabricated equipment. The emission of particulates, even in minute amounts, during semiconductor manufacture, can contaminate the semiconductor, causing it to be discarded.

Still another example of fluoropolymer is that containing hydrocarbon groups in the polymer chain are copolymers of tetrafluoroethylene or chlorotrifluoroethylene with ethylene, known as ETFE and ECTFE, respectively and copolymers of tetrafluoroethylene/hexafluoropropylene/vinylidene fluoride, known as THV.

The fluoropolymers may be crystalline or amorphous. By crystalline is meant that the polymers have some crystallinity and are characterized by a detectable melting point measured according to ASTM D 3418, and a melting endotherm of at least about 3 J/g. Melt-processible polymers that are not crystalline according to the preceding definition are amorphous. Amorphous polymers include elastomers, which are distinguished by having a glass transition temperature of less than about 20° C. as measured according to ASTM D 3418.

In addition to having reduced oligomer content, the fluoropolymer of the present invention should also be free of other possible sources of contamination. One of the most common contaminates that might be present in the copolymer is alkali or alkaline earth metal (ion) such as arise from the particular initiator used to carry out the polymerization that forms the fluoropolymer. The work up of the fluoropolymer from the polymerization medium to prepare it for feeding to the melt processing equipment includes steps to remove such metal from the polymer, to avoid any adverse effect therefrom in melt processing. In accordance with the present invention, no alkali or alkaline earth metal is added to the polymerization system, whereby the fluoropolymer is free of such metal. Instead, a polymerization initiator that is free of such metal, such as ammonium persulfate is used. By substantially free of alkali and alkaline earth metal is meant that the fluoropolymer contains no more than 10 ppm, preferably no more than 5 ppm of alkali and alkaline earth metal.

EXAMPLES

All of the melt processing in the Examples is carried out with a 57 mm twin-screw extruder, equipped with an injection probe, which is a rod having a longitudinal bore opening flush with the interior surface of the extruder barrel in the surface renewal zone, and a vacuum port in the devolatilization zone. The twin screw extruder feeds the molten fluoropolymer into a 120 mm single-screw extruder, which is equipped with a die. The twin-screw extruder serves as a resin melter and oligomer remover and the single-screw extruder serves as a melt pump to generate the pressure necessary to move the resin through the screen pack and die. Polymer exiting the die is cut and cooled.

The twin-screw extrusion equipment described above is a Kombiplast® extruder from the Coperion Corporation. Corrosion-resistant materials are used for those parts that come into contact with the polymer melt. The twin-screw extruder has two corotating screws disposed side by side. The screw configurations are designed with an intermeshing profile and close clearances, causing them to be self-wiping. The screw configurations include kneading blocks, mixing elements, and conveying screw bushings. The first 15 Length/Diameter units (L/D, L being the interior length of the extruder barrel D being the diameter of the bushings) of the extruder is the melting zone. This contains the feeding, solids conveying, and kneading block sections. The kneading block sections provide high shear and insure proper melting of the polymer. The melting section ends with a left-handed bushing (rearward pumping) that forms a melt seal and insures complete filling of the final kneading blocks. The melt seal forms the entry into the surface renewal zone.

The next 19 L/D contain the extruder screw elements that create the infinite surface of the molten fluoropolymer and convey the molten fluoropolymer towards the devolatilization zone. The extruder elements include mixing elements that accomplish the surface renewal at low shear as the molten fluoropolymer passes through the surface renewal zone. The elements making up the surface renewal zone contain one 80 mm undercut conveying bushing (also known as a SK bushing where 80 mm is both the length of the element and the pitch of the helical flight in one revolution of the element), one 40 mm conveying bushing that transitions from undercut to standard (also known as a SK—N bushing where 40 mm is the length of the element and the pitch of the helical flight in one revolution of the element is 80 mm), two 40 mm conveying bushings (40 mm is both the length of the element and the pitch of the helical flight in one revolution of the element), two 30 mm ZME elements (where 30 mm is the length of the element, and the pitch of the helical flight in one revolution of the element is 15 mm), one 40 mm conveying bushing, three SME elements (40 mm is both the length of the element and the pitch of the helical flight in one revolution of the element), two 40 mm conveying bushings, four TME elements (20 mm is the length of the element and there is no pitch), two 40 mm conveying bushings, three TME elements, two 40 mm conveying bushings, two ZME elements, two 40 mm conveying bushing, one 30 mm conveying bushing (30 mm is both the length of the element and the pitch of the helical flight in one revolution of the element) and a 20 mm left-handed bushing (where 20 mm is the length of the element and the pitch of the helical flight in one revolution of the element is 40 mm) to provide a melt seal with respect to the devolatilization zone.

The ZME elements are shown as multiple elements in FIG. 4 of U.S. Pat. No. 5,318,358, and as shown in FIG. 1 of the patent are reverse pumping with respect to the direction of advancement of the molten fluoropolymer through the extruder. These elements also have notches in the periphery of the screw flight to enable the molten fluoropolymer to be broken into small streams traveling in the direction of advancement of the fluoropolymer. The TME elements resemble the ZME elements except that they are neutral with respect to pumping action, i.e. they resemble a gear. The SME elements resemble the ZME elements except that they are forward pumping. Each ZME, TME, and SME element has at least 10 notches in the periphery of its respective flights. All these elements are bilobal (two flights per element), except for the ZME which has only one lobe (one flight) and the TME element which is a cylindrical notched disc.

A 1 mm thick spacer ring is present between conveying bushings and ZME elements. The elements making up the surface renewal zone do not cause the molten fluoropolymer to fill up this zone, i.e. vapor space is available and in contact with the small streams of molten fluoropolymer being created and recreated by the multiple ZME, TME and SME elements. The surface renewal zone includes a gas injection port positioned near the beginning of the zone to feed gas into the zone, if used in the particular melt processing of the Example. The residence time of the molten fluoropolymer in the surface renewal zone is 35 seconds.

The next 5 L/D contains the vacuum extraction section (devolatilization zone). The devolatilization zone includes melt forwarding elements that provide for free volume, so that the molten polymer is exposed to subatmospheric pressure so that reactive and corrosive gases do not escape into the atmosphere. The vacuum used in the devolatilization zone in the Examples is 13.7 psia (95 kPa).

Undercut bushings (SK) are an effective way to provide the forwarding elements in the devolatilization zone in the Examples. The final 2 L/D are used to provide a vacuum seal and pump the molten polymer into the single-screw extruder. The vacuum applied to the devolatization zone communicates with a cylindrical chamber between the vacuum source and the devolatilization zone, and the vacuum is applied through a tared 50 mesh screen positioned across this chamber. The volatilized oligomer condenses on this screen. Removal of the screen and weighing of the condensed oligomer while on the screen reveals the amount of oligomer removed. Comparison of this weight of oligomer with the weight of fluoropolymer melt processed in the extruder during the time of oligomer collection on the screen reveals the weight proportion of oligomer that was formerly present in the fluoropolymer prior to oligomer removal. Without the presence of the screen or other collection device, the effect of oligomer removal as part of the melt processing operation could not be detected.

The waxy solid recovered from the screen is heated in a gas chromatograph (GC) to 250° C. and the resulting gas stream is analyzed. The GC peaks indicate a wide distribution of perfluorinated carbon compounds between $C_{11}F_{24}$ and $C_{20}F_{42}$. Some residual material remains indicating that even higher boiling components are present. This analysis indicates that the waxy solid is a mixture of fluorocarbon oligomers.

The twin-screw extruder empties into a single-screw melt pump, which is designed to generate pressure at low shear rates for filtration and pellet formation. The extruded melt is melt cut through a die with 250 die holes (2.5 mm). The pellets are cooled by a stream of water.

Both the twin-screw extruder and the single-screw extruder are operated with barrel set-point temperatures of 300° C. except for the die, which is set at 350° C.

Example 1

A compacted flake of a copolymer of tetrafluoroethylene (TFE), with 12.0 to 12.3 weight percent hexafluoropropylene (HFP), i.e. HFPI of 3.8, and 1.1 to 1.3 weight percent perfluoro(ethyl vinyl ether) (PEVE) commonly known as FEP, polymerized with ammonium persulfate (APS) initiator, is used as the feed material. The polymer has an initial melt flow rate (MFR) of 31.9 to 32.5 and is free of alkali and alkaline earth metal arising from ingredients added in polymerization or afterward. The vacuum system is opened up after operation for 60 minutes without injecting any gas into the surface renewal zone, and a few small particles of waxy material are observed on the screen in the vacuum system. The weight ratio of waxy material to polymer processed through the extruder is 2 ppm. This is determined by subtracting the weight of the screen before the run from the weight of the screen plus oligomer after the run to determine the weight of oligomer collected and comparing this oligomer weight with the weight of fluoropolymer melt processed during the time of the melt processing run.

Example 2

Melt processing similar to Example 1 and using the same fluoropolymer as in Example 1, is conducted except the process is operated for 10 minutes without injecting any gas. Nitrogen is injected for 40 minutes at a 9,500 ppm weight ratio of nitrogen to fluoropolymer. The screen is removed. The screen is covered with a waxy solid similar to that analyzed in Example 1, but in a much greater amount. The weight ratio of waxy material (oligomer) to fluoropolymer processed through the extruder during the 40 min. run with nitrogen injection is 50 ppm (net amount after deducting the amount of oligomer collected during the 10 min of operation without any nitrogen injection)

Example 3

Melt processing similar to Example 1 and using the same fluoropolymer as in Example 1 is conducted except the process is operated for 5 minutes without injecting any gas. A fluorination agent consisting of 10 mole % $F_2$ in $N_2$ is then injected into the extruder for 15 minutes at 1300 ppm by weight fluorine. Nitrogen by itself is then injected for 20 minutes at a 9,500 ppm weight ratio of nitrogen to polymer. The run is continued for another 5 min without any gas injection to facilitate evacuation of fluorine from the molten fluoropolymer. The screen is removed. The screen has a thick layer of a waxy solid similar to that obtained in Example 2 but in an even much greater amount. The weight ratio of waxy material to fluoropolymer polymer processed through the extruder during this melt processing run is greater than 500 ppm (net amount after subtracting the amount of oligomer collected during the 30 minutes of the run during which no fluorine is injected into the extruder). In Examples 2 and 3, the runs are shut down before reaching 60 min run time to avoid blockage (plugging) of the vacuum system by the oligomer collecting on the screen. Example 3 was allowed to run even though the oligomer buildup exceeded that of Example 2, until the vacuum could no longer be drawn on the devolatilization zone.

The amount of oligomer removed in Examples 2 and 3 represent the reduction in oligomer content from the starting fluoropolymer, i.e. the as-polymerized fluoropolymer. From these Examples, it is seen that that the minimum removal of 25 ppm oligomer is easily achieved, and when fluorine used as the gas, removal of at least 200 ppm of oligomer is also easily achieved. The small amount of oligomer removed when no gas is used as in Example 1 represents a greater amount than would be removed by conventional extrusion when a devolatilization zone is included in the extruder.

In the following Examples, the fluoropolymer itself is tested for oligomer content by the reduction in particulates when subjected to the Smoke Detector Test. The test functions by capturing the voltage signal from the ionization chamber of a smoke detector and monitoring it as particulates are emitted from the fluoropolymer being tested at elevated temperatures flow through the ionization chamber. As the oligomer particles pass through the ionization chamber, the voltage signal changes, and the magnitude of the change is proportional to the amount of particulates passing through the chamber. By monitoring this voltage changes, the difference between oligomer content in the resins can be discerned.

In greater detail, the Smoke Detector Test is conducted as follows: A sample of fluoropolymer is heated in an air-supplied furnace at a specified temperature. The particulates emitted by the sample are concentrated (without condensing) by a funnel acting as a hood over the heated sample and flow with the air into a 20 L vessel containing the smoke detector. The purpose of the 20 L vessel is to provide a hold-up volume so that the ionization chamber of the smoke detector has sufficient time to detect materials passing through it. Changes in the output voltage of the smoke detector are recorded using a simple strip chart recorder. The gases pass out of the 20 L vessel through a water trap to collect any particulates emitted for subsequent particle size analysis. The particle size analysis shows a strong correlation with the voltage change, verifying that the smoke detector is a good particulate detector. Next, the gas stream passes through a flow meter, then to house vacuum. Control of the gas flow in the system is desirable since the voltage output of the smoke detector is proportional to the concentration of particulates passing through the ionization chamber.

For the furnace, a Thermolyne Type 6000 ashing furnace is used. Air is supplied to the furnace at 37 slpm. A 5" (12.7 cm) diameter stainless steel funnel welded to ⅜" (0.95 cm) ID stainless steel tubing is used to transfer the gas from the oven to the 20 L container, a Qorkpak® pail with a gasketed lid and pouring spout. The stainless steel tubing penetrates the bucket through a number four stopper in the pouring spout at the top of the container. The outlet gases and smoke detector voltage leads pass out of the bucket through a 2-hole number 12 stopper pressed into a 2 in (5.1 cm) hole cut near the bottom of the bucket. This location is selected to insure efficient air flow through the ionization chamber of the smoke detector.

The smoke detector used is a Kidde®-brand ionization smoke alarm, model number 0916. The smoke detector contains a 0.9µ Curie Americium 241 source (half life of 432 years) and a Motorola MC145017P ionization smoke detector integrated circuit chip. The detector used is less than two years old. The voltage leads are soldered to positions 14, 15, and 16 on the chip and power is supplied via a standard 9 V battery. Exposed to air, the voltage output of this circuitry is 4.9-5.0 V. The smoke detector sits in the middle of the 20 L container on a tripod covered with a non-conductive filled PTFE gasket.

The strip chart recorder used for this experiment is a Cole-Parmer 100 mm 0-5 V model with a chart speed of 1 cm/min. The water vacuum trap in this set-up is a 250 mL graduated cylinder filled with 100±0.5 g HPLC-grade water from J. T. Baker and is connected to both the 20 L container and the flow meter with latex tubing. The flow meter is a Gilmont size 13 flow meter with a range of 200-14,000 mL/min. Air flow through the system, as determined via this flow meter, is 6 L/min and is adjusted directly via the connection to house vacuum.

Fluoropolymer samples tested in this Test are 25 mil (0.64 mm) films that are hot-pressed (5 min at 350° C., then 5 min under cold pressure). Squares of these films weighing 1.00±0.05 g are held at oven temperatures ranging from 200° C. and 350° C. for 60 min while changes in the voltage output of the smoke detector are recorded on the strip chart. These temperatures simulate high service temperatures, 200° C. being the maximum service temperature for FEP, and melt processing temperature, respectively. Clean water is placed in the vacuum trap for each experiment and the gases are bubbled through it for 60 min, the sample is removed from the oven, and gases are bubbled through for an additional 5 min, for a total of 65 min gas collection time. The vacuum trap is then removed and the system is allowed to purge for an additional 5 min to remove any residual material—the total system purge time is therefore 10 min. The heating of the film samples is conducted in small, 5" (12.7 cm) diameter aluminum pie pans that have been previously heated to 385° C. for 10 min to remove residual manufacturing oils.

For each sample tested, the maximum voltage change is reported as the difference between the baseline (empty) value and the lowest voltage recorded on the strip chart during the entire run. This correlates well with the integral of the area between the baseline voltage and the voltage change curve.

Example 4

Film samples of the fluoropolymer obtained from the melt processing of Examples 1-3 are subjected to the Smoke Detector Test, at 200° C., which is the upper continuous use temperature for this fluoropolymer, with the following results:

| Fluoropolymer Treatment | Voltage Change - volts |
|---|---|
| no gas | 0.6 |
| nitrogen | 0.45 |
| fluorine | no change |

The voltage change when nitrogen is used is 75% of the voltage change when no gas is used, while the voltage change when fluorine is used is even less than 25% of the voltage change when no gas is used.

Example 5

Film samples of the fluoropolymer obtained from the melt processing of Examples 1-3 are subjected to the Smoke Detector Test, at 350° C. with the following results:

| Fluoropolymer Treatment | Voltage Change - volts |
|---|---|
| no gas | 2.4 |
| nitrogen | 1.9 |
| fluorine | 1.7 |

The greater voltage change when the Test is carried out at 350° C. as compared to 200° C. indicates the relatively large amount of oligomer remaining in the fluoropolymer, i.e. having a significant vapor pressure only above 200° C.

A commercially obtained sample of FEP from another manufacturer, labeled as NP-101, gives a voltage change of 2.5 volts.

What is claimed is:

1. Melt-processible fluoropolymer having at least about 25 ppm less oligomer than said fluoropolymer as-polymerized, said fluoropolymer as-polymerized being free of alkali and alkaline earth metal, said oligomer having the formula $C_xF_y$, wherein x is at least 11 and y is at least 24.

2. The melt-processible fluoropolymer of claim 1 having at least about 200 ppm less oligomer than said fluoropolymer as-polymerized.

3. The melt-processible fluoropolymer of claim 1 wherein said oligomer is a mixture of oligomers having the formula between $C_{11}F_{24}$ and $C_{20}F_{42}$ and possibly containing even higher boiling oligomers.

4. A process comprising melt fabricating melt-processible fluoropolymer having at least about 25 ppm less oligomer than said fluoropolymer as-polymerized, after polymerizing said fluoropolymer such that it is free of alkali and alkaline earth metal, said oligomer having the formula $C_xF_y$, wherein x is at least 11 and y is at least 24.

5. Melt-processible fluoropolymer which upon being subjected to the Smoke Detector Test at the upper continuous use temperature for said fluoropolymer exhibits a voltage change of no more than about 25% of the voltage change for said fluoropolymer as polymerized, said fluoropolymer as-polymerized being free of alkali and alkaline earth metal.

* * * * *